March 17, 1931.    L. E. PADELFORD    1,796,302
TOASTING DEVICE
Filed Feb. 11, 1930    3 Sheets-Sheet 1

INVENTOR
LESTER E. PADELFORD
By
ATTORNEY

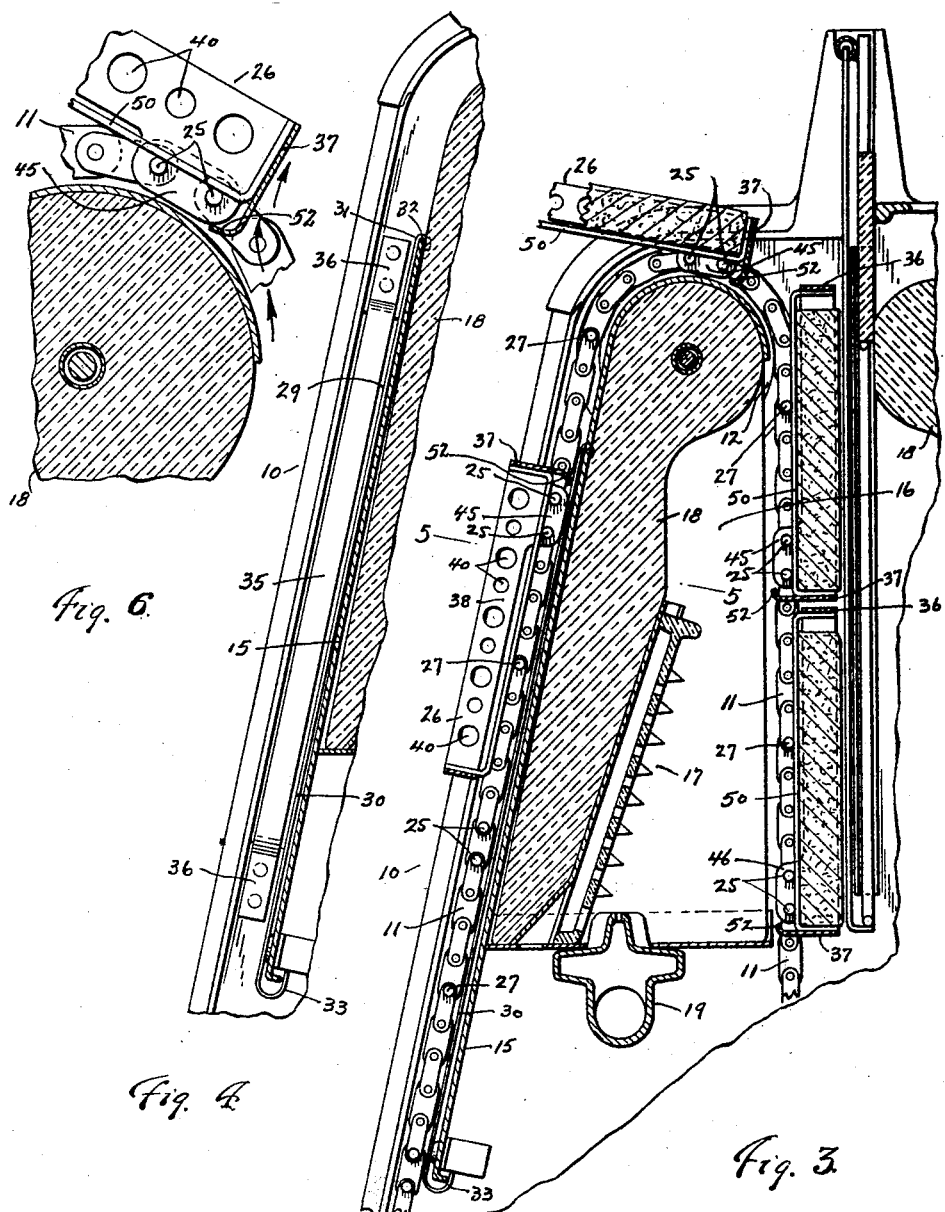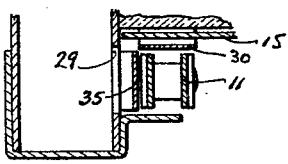

Patented Mar. 17, 1931

1,796,302

UNITED STATES PATENT OFFICE

LESTER E. PADLEFORD, OF BUFFALO, NEW YORK, ASSIGNOR TO THE REPUBLIC METALWARE COMPANY, OF BUFFALO, NEW YORK, A CORPORATION OF NEW YORK

TOASTING DEVICE

Application filed February 11, 1930. Serial No. 427,621.

My invention relates in general to toasting devices, and in particular to an improved basket for such devices, and to means for assembling and supporting such baskets.

It is well known to those skilled in the art that in toasting devices of this nature, there is a tendency for the bread to be burned at the under forward edges as it is being moved downwardly into the toasting chamber by the baskets.

One of the objects of my invention has been to provide a basket which shall shield the under forward edge of the bread, and thus prevent burning thereof.

Another object has been to provide means for mounting the toast baskets, whereby they may be easily assembled and disassembled.

Moreover, my device is so designed that the baskets passing upwardly in an inclined plane will be kept spaced apart from the front plate of the machine, thereby preventing the same from becoming marred or defaced.

The above objects and advantages have been accomplished by the device shown in the accompanying drawings, of which:

Fig. 3 is a fragmentary, sectional view, taken on line 3—3 of Fig. 2.

Fig. 4 is a similar sectional view, taken on line 4—4 of Fig. 2 with the sprocket chain removed.

Fig. 5 is a fragmentary, transverse, sectional view, taken on line 5—5 of Fig. 3.

Fig. 6 is an enlarged, fragmentary view, showing one of the toast baskets in the position it occupies as it is entering the chamber of the toasting device.

Figure 1:
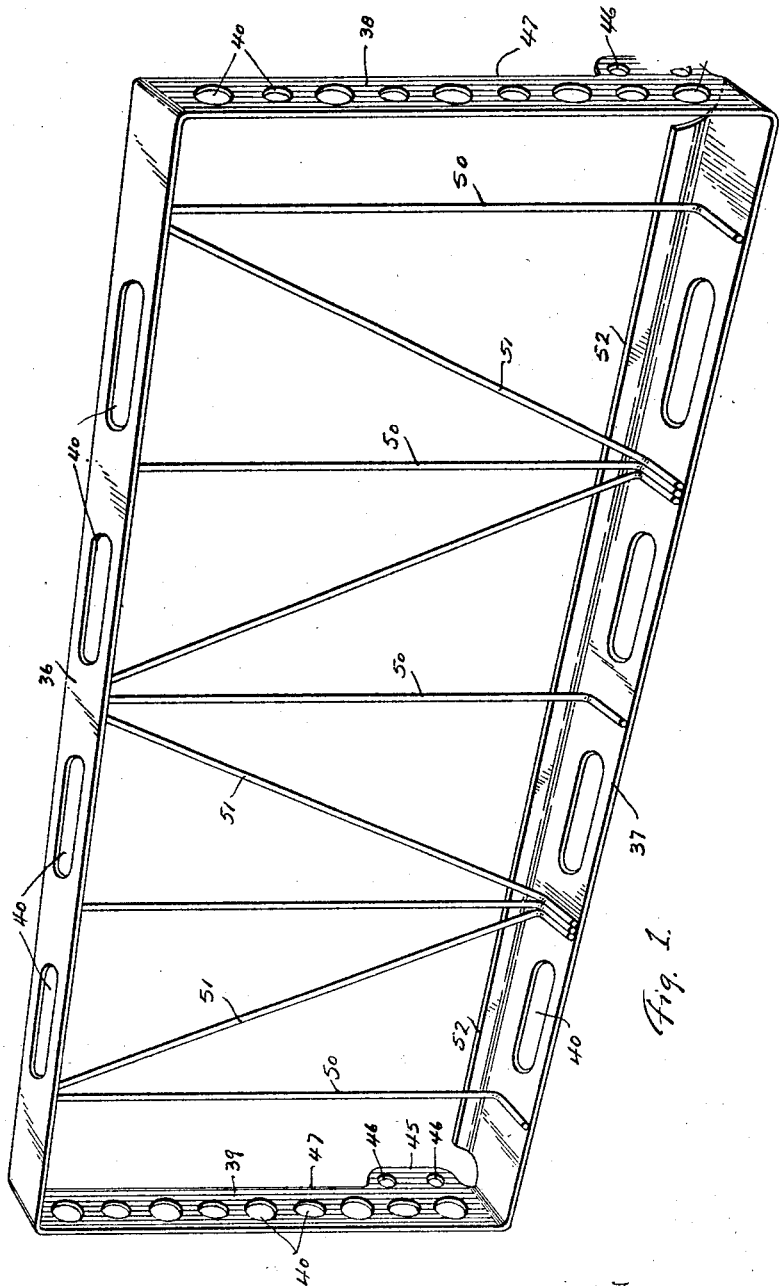
Fig. 1 is a perspective view of my improved toast basket.
Figure 2:
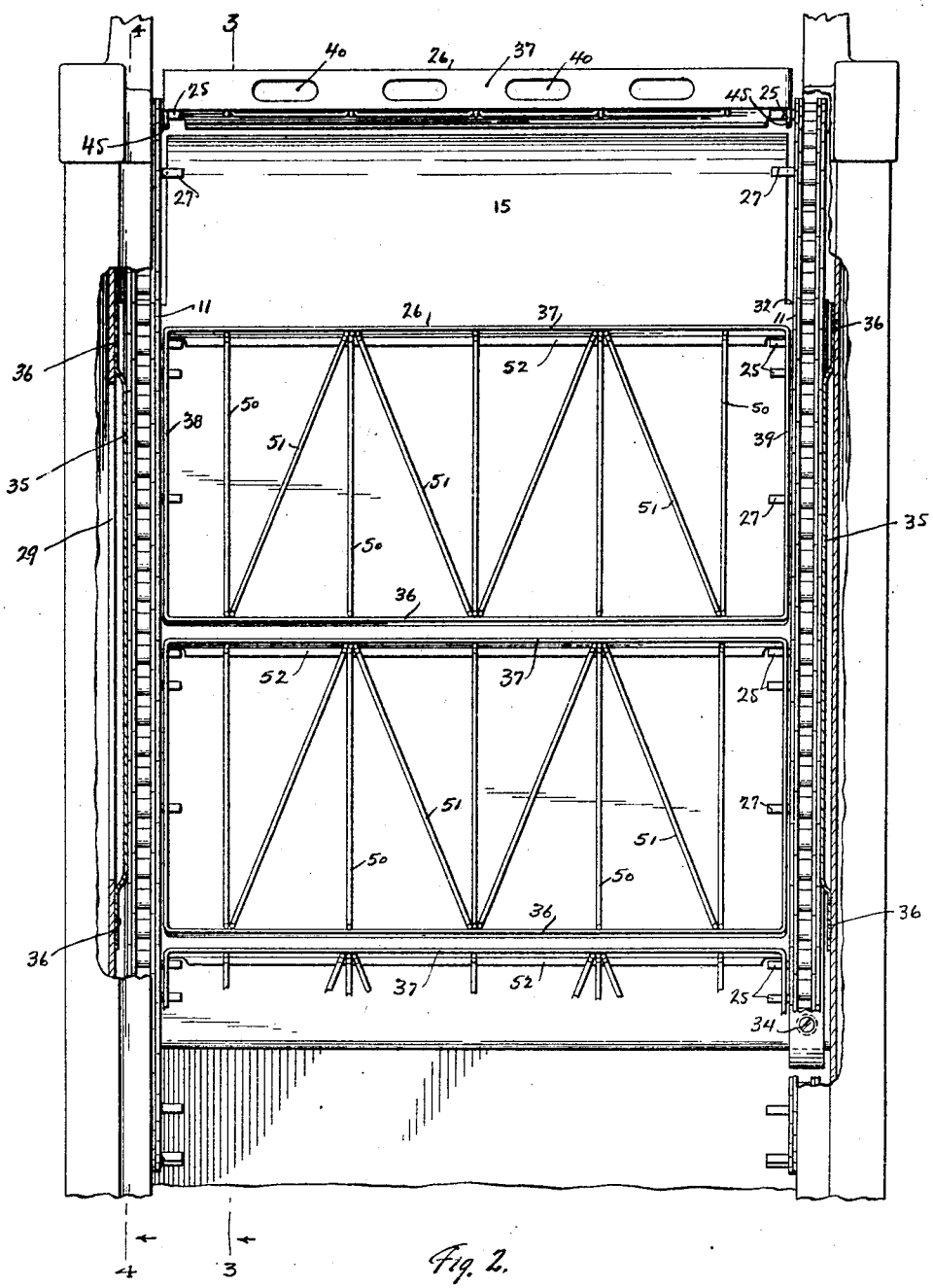
Fig. 2 is a fragmentary, face view, partly in section, of a toasting device, showing a number of my baskets in position therein.

In the accompanying drawings, I have shown my invention as applied to a toasting device of the gas heated type in which the baskets are carried upwardly over the front of the machine which is inclined backwardly.

In the drawings, 10 represents the toasting machine having a conveyor chain 11 arranged at each side thereof. These chains, of course, pass over suitable sprockets 12 arranged at suitable places, the sprockets at the upper end of the device only being shown for purposes of clearness. The front plate of the machine is shown at 15, which, as hereinbefore pointed out, is inclined backwardly in a plane substantially parallel to the upward passes of the chains 11. This plate is curved around the top of the device at a radius which is substantially concentric with the sprocket wheel 12.

Arranged in the center of the device is the toasting chamber 16 of my device, on each side of which is provided a radiant element 17. This element is carried by an asbestos oven wall 18, and arranged beneath each of the radiants is a suitable gas burner 19.

The chains 11 are provided with pairs of attachment pins 25 arranged oppositely on the chains for the support of the baskets 26 of my device. These pins may be attached to the links of the chains, but they are preferably formed as a continuation of the pivot pins of the links of the chains. Since these pins are spaced apart from each other, as shown, it is obvious that the baskets 26 will be carried along by the chains in a plane substantially parallel to the plane of movement of the chains, and that when the chains are passing around a sprocket, as for instance the sprocket 12 at the upper end of the device, the general plane of the basket will be arranged substantially at a tangent to the curvature of the chain, as shown in Figs. 3 and 6. The baskets, however, in their upward passage across the front plate 15 will have a tendency to sag, due to the inclination and the slack of the chain. To prevent this, I provide a stop pin 27 for each of the pairs of attachment pins 25, and I space the stop pin a distance from the attachment pins so that they will properly hold the baskets in alignment during the upward and downward passes of the chains.

To further assure that the baskets and sprocket chains will be kept free from the front plate 15, I provide a guide strip 30 along each edge of the front plate and in the path of the upward pass of each of the chains 11. Each of these guide strips may be provided with a hooked upper end 31 which is designed to engage the upper edge 32 of the front plate, which edge is provided by a cut-away portion at each side. The lower end 33 of each of these guide strips is preferably curved inwardly under the lower edge of the front plate 15. Each of these strips may be secured in place by means of a screw 34.

The chains 11, obviously, have some sidewise movement between the sprockets during their upward pass. I utilize this movement to attach the baskets 26 to the attachment pins 25, or to detach them therefrom. To insure, however, that the basket may not become accidentally detached by such sidewise movement, I provide a retaining spring 35 at each side of the device and along the middle portion of the upward passes of the chains. These springs yieldably keep the chains in true alignment and prevent sidewise movement thereof occurring except at such time as they are manually pressed outwardly to attach or detach the baskets. It is preferable, however, to provide an opening 29 in the casing of the device opposite one of the springs to permit the spring and the chain at that side to have sufficient sidewise movement to engage or disengage the attachment pins with the baskets. These springs 35 may be provided with offset ends 36 which are secured to the casing of the toasting device by any suitable means.

Each of the toast baskets 26 of my device is rectangular in shape, and of a size suitable for the number of pieces of bread being handled by each basket. These baskets are made of relatively light material and are of a depth suitable for the thickness of the slices of bread to be toasted. The side walls 36 and 37, as well as the end walls 38 and 39, may each be formed with perforations 40 which permit the free circulation of the heat and reduce the amount of metal in contact with the bread. The end walls 38 and 39 are each provided near the wall 37 with an inwardly extending tab 45, each formed with two openings 46, so spaced that they will register with a pair of attachment pins 25. The holes 46 are so positioned laterally of the width of the walls 38 and 39, that the rear edge 47 of the basket will contact with the stop pin 27 when the basket is in a position which is substantially in line with the chains 11.

Each of the baskets 26 has a bottom formed of small wires 50 and 51, the wires 50 being preferably arranged parallel to the walls 38 and 39, while the wires 51 are arranged at an angle so as to act as braces to strengthen the basket and make it rigid. The side 37 of each of the baskets is the advance side thereof, and a flange 52 is formed at its inner edge. This flange extends outwardly beyond the inner edges of the other side and end walls, and is curved inwardly toward the opposite side wall 36. The extension of the flange is such as to bring its outer face and edge close to the curved portion 41 of the front plate 15 as the basket is being moved around this curved portion and into the toasting chamber 16 of the device. This flange thus acts, as shown in Figs. 3 and 6, to deflect the heat upwardly along the outside of the side wall 37 and thus prevent its passage under the side wall and subsequent contact with the edge of the toast. By thus deflecting the heat, the edge of the toast is prevented from being burned either as it enters the heating chamber, or during its passage through such chamber, as a result of the extra heat received locally at the edge during its passage therein (see Fig. 6).

From the foregoing it will be clear that when it is desired to remove one of the baskets 26, it is only necessary to press the chain 11 which is adjacent the opening 29 outwardly at a point preferably midway between the supporting sprockets, whereupon the spring 35 will yield to the pressure and permit the chain to be moved far enough to disengage the pair of attachment pins 25 from the apertures 46 in the basket. This will release one end of the basket, the other being easily lifted off the opposite pair of attachment pins.

Obviously, some modifications of the details herein shown and described may be made without departing from the spirit of my invention or the scope of the appended claims, and I do not, therefore, wish to be limited to the exact embodiment herein shown and described, the form shown being merely a preferred embodiment thereof.

Having thus described my invention, what I claim is:

1. The combination with a toasting device having sprocket chains and a plurality of toast baskets, of a plurality of pairs of attachment pins carried by the chains for engagement with the baskets, and a retaining spring for each of the chains arranged adjacent the edge of the chains which is opposite to the edge carrying the attachment pins.

2. The combination with a toasting device having sprocket chains and a plurality of toast baskets, of a plurality of pairs of attachment pins carried by the chains for engagement with the baskets, a stop pin carried by each chain for each basket, and a retaining spring for each of the chains arranged adjacent the edge of the chains which is opposite to the edge carrying the attachment pins.

3. The combination with a toasting device having sprocket chains and a plurality of toast baskets, of a plurality of pairs of attachment pins carried by the chains for engagement with the baskets, a retaining spring for each of the chains arranged adjacent the edge of the chains which is opposite to the edge carrying the attachment pins, and a yielding guide strip for each of the chains, arranged underneath each of the chains and adjacent its upward pass.

4. A toasting device comprising a plurality of toast baskets, conveyor chains for carrying said baskets, each of said baskets comprising side walls and end walls, and an inwardly projecting flange carried by the forward side wall, whereby the toasting heat is deflected from the bread being toasted during the passage of the basket into the toasting chamber of the device.

5. A toasting device comprising a plurality of toast baskets, conveyor chains for carrying said baskets, each of said baskets comprising side walls and end walls, an inwardly projecting flange carried by the forward side wall, a plurality of parallel wires, and a plurality of wires arranged at an angle to the parallel wires for forming the bottom of the basket.

In testimony whereof, I have hereunto signed my name.

LESTER E. PADELFORD.